United States Patent
Mao et al.

(10) Patent No.: US 10,050,505 B2
(45) Date of Patent: Aug. 14, 2018

(54) LINEAR VIBRATION MOTOR

(71) Applicants: Lubin Mao, Shenzhen (CN); Hongxing Wang, Shenzhen (CN)

(72) Inventors: Lubin Mao, Shenzhen (CN); Hongxing Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 332 days.

(21) Appl. No.: 15/005,039

(22) Filed: Jan. 25, 2016

(65) Prior Publication Data

US 2016/0365783 A1    Dec. 15, 2016

(30) Foreign Application Priority Data

Jun. 15, 2015  (CN) .................... 2015 2 0413196 U

(51) Int. Cl.
*H02K 33/00*    (2006.01)
*H02K 33/16*    (2006.01)
*H02K 7/08*     (2006.01)

(52) U.S. Cl.
CPC ............. *H02K 33/00* (2013.01); *H02K 33/16* (2013.01); *H02K 7/08* (2013.01)

(58) Field of Classification Search
CPC . H02K 5/16–5/1737; H02K 7/08–7/09; H02K 33/00–35/06
See application file for complete search history.

(56) References Cited

U.S. PATENT DOCUMENTS 4,525,695 A * 6/1985 Sheng .................. H01F 7/1615
                                                    137/625.65

* cited by examiner

*Primary Examiner* — Ramon M Barrera
(74) *Attorney, Agent, or Firm* — Na Xu; IPro, PLLC

(57) ABSTRACT

A linear vibration motor is disclosed. The linear vibration motor includes a housing, a vibrator placed in the housing and an elastic component providing the vibrator with restoring force of vibration. The linear vibration motor also comprises a guide device including an internal guide device, an external guide device, a ball location device arranged between the internal guide device and the external guide device and moving opposite to the housing, and multiple balls positioned on the ball location device. The balls are propped against the external guide device and the internal guide device respectively. Moreover, the rollers will roll in presence of drive effect of the internal guide device and roll at the permanent position. The vibrator is propped in the housing by using the balls.

9 Claims, 5 Drawing Sheets

LINEAR VIBRATION MOTOR

FIELD OF THE INVENTION

The present disclosure is related to motors, specifically to a linear vibration motor for converting electric signals to mechanical vibration which is sensible for human body.

DESCRIPTION OF RELATED ART

A vibration motor shall be applied to feedback of system generally, for example, incoming call prompt of mobile phone, vibration feedback of game player, etc. for the portable consumer electronic products, such as a mobile phone, a handheld game player, a navigation unit or a handheld multimedia entertainment equipment; and the motor used mainly refers to several types, such as columnar core motor, coreless motor and flat vibration motor.

All kinds of components of the internal part thereof are required to adapt to the trend of light and thin along the development direction of light and thin consumer electronic products. The motor is not of exception.

A linear vibration motor is characterized in that the vibration direction of the vibration unit refers to straight reciprocating motion and has been applied and installed on the consumer electronic products widely because of stable vibration and small noise thereof. Please refer to Chinese patent application No.: CN200480000815.4 publicized on Nov. 23, 2005, U.S. Pat. No. 6,466,682 publicized on Oct. 15, 2002, U.S. Pat. No. 7,099,489 publicized on Aug. 29, 2006, etc.

However, the vibration direction of the vibration unit of the said vibration motor involves the vertical direction, that is, vertical to the installation plane; and great vertical height is required to provide because the vibration direction is vertical to the installation plane in order to facilitate up-and-down motion of the vibration unit and increase the height of the whole motor. Yet, it is not useful for development of thin motor.

On this basis, the vibration motor with vibration direction vertical to the thickness direction of the device where the vibration motor is located was studied. For example, the Chinese patent application No.: 200910105497.2 publicized on Jul. 22, 2009 disclosed the vibration motor of suspending the vibrator in the housing by using the spring component, wherein the problem that the said vertical vibration motor required great vibration space was solved excellently by setting the vibration direction of the vibrator parallel with the installation surface of the vibration motor (transverse vibration) by using the magnetic circuit and the coils set in advance.

The vibrator of the said transverse vibration motor was suspended by using the spring component, and the spring component received the elastic restoring force offered to the vibrator through extrusion and releasing continuously during vibrating process of the vibrator. However, the sense of vibration was reduced because the vibrator vibrated transversely during vibrating process due to flaky structure of the spring component and cannot move excellently along the straight line as a result of reversion of the elastic deformation of the spring component.

Therefore, it is necessary to provide a new linear vibration motor to overcome the problems mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the Figs. and the embodiment. It should be understood the specific embodiment described hereby is only to explain this disclosure, not intended to limit this disclosure.

Figure 1:
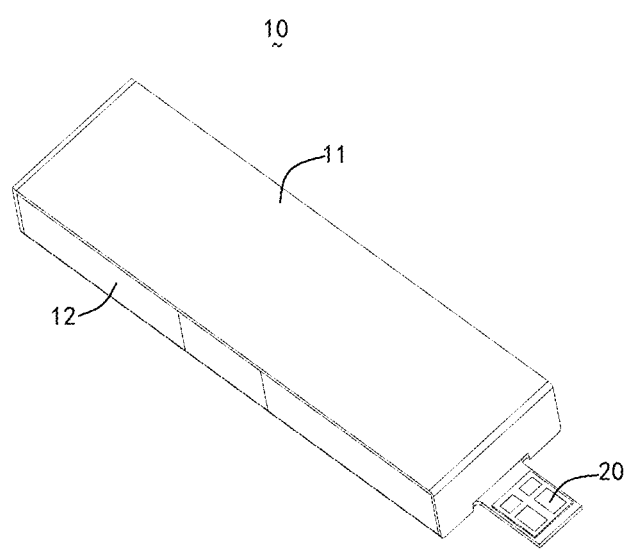
FIG. 1 is an isometric view of a linear vibration motor in accordance with an exemplary embodiment of the present disclosure.

A linear vibration motor 100, in accordance with an exemplary embodiment of the present disclosure, is shown in the FIG. 1 and comprises a cover 11 and a housing 12 forming the accommodation space with the cover 11, as well as a conducting end 20 connecting with the external circuit in order to receiving the external electric signal.

In the embodiment, the housing is formed by a cover 11 and a housing 12 which can be set by using other mode according to different manufacturing processes or assembling processes, for example, the cover 11 and the housing 12 can be formed integrally, or the cover 11 has the structure of the housing 12, or the housing 12 has the structure of the cover 11. In short, the housing formed by the cover 11 and the housing 12 shall offer a accommodation space to accommodate other components of the linear vibration motor 100 therein. As for the materials of the cover 11 and the housing 12, the available material of the linear vibration motor, or metal, or plastic, or mixture of the metal and the plastic can be adopted. What shall be explained is that the so-called housing shall involve both appearance components forming the linear vibration motor 100, appearance components and other components which are fixed with respect to the appearance components. Further, the housing can be the stator in the vibration motor; and the so-called stator shall involve the components (such as housing, the cover) or set of the components (except other components of the vibrator) which is immobile with respect to the installation location of the linear vibration motor.

Figure 2:
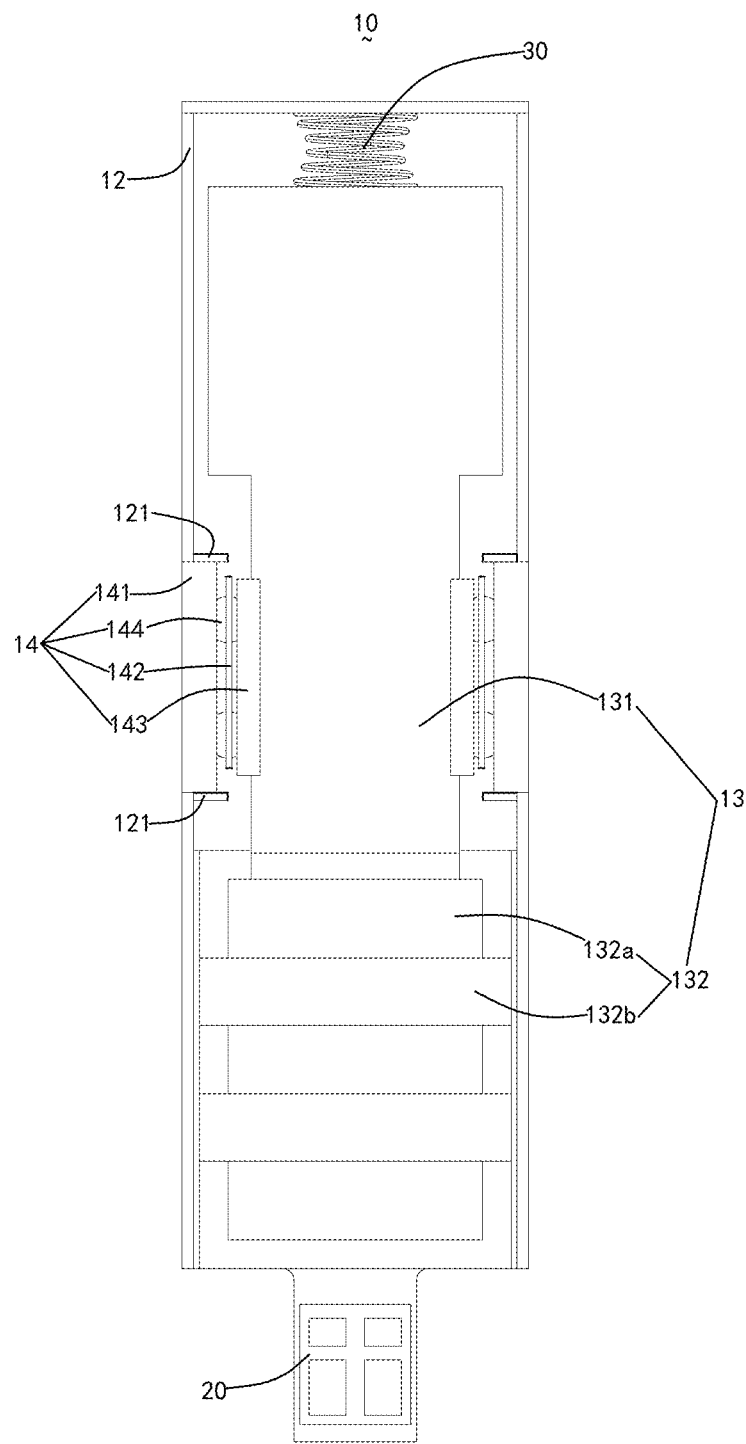
FIG. 2 is a top view of the linear vibration motor in FIG. 1, wherein a cover of the linear vibration motor is removed in order to facilitate viewing.

The structure of the internal part of the accommodation space is displayed in the FIG. 2 clearly, and the cover 11 has been removed. In view of the long-strip housing, the components of the internal part shall be shaped as long strips approximately. The internal components include a vibrator 13, a guide device 14 suspending the vibrator 13, and an elastic component 30 providing the vibrator 13 with elastic restoring force. The vibrator 13 further comprises a mass 131 and a drive device 132 assembling and connecting with the mass 131. In the embodiment, the mass 131 is located on one end of the drive device 132, that is, both of them are located on two ends of the vibrator 13. Actually, the drive device 132 is used for driving vibrations of the whole vibrator 13, and the mass 131 is used for improving the amplitude by increasing the driving force; therefore, the positional relationship of the two parts is not limited to what is shown in FIG. 2, and can be arranged in the forms of other structures, for example, the mass includes two parts, while the drive device is arranged among the two masses; or the drive device includes two parts, and the mass is arranged among the two drive device; and the said structures are feasible. What shall be explained is that the elastic component 30 can be spring, leaf spring or other devices which can be compressed and released, such as compressed air device, magnetic attracting/repelling device, etc.

Further, the drive device 132 includes a magnet 132a and multiple coils 132b surrounding the magnet 132a. Moreover, see contents in background technology of the parent application document or the technical content of the available parent quoted in the background technologies for interaction of the magnet and the coils of the transverse linear vibration motor, and the embodiment shall not repeat it any longer.

The guide device 14 comprises an external guide device 141, a ball location device 142, an internal guide device 143 and multiple balls 144. The external guide device 141 is fixed in the housing 12 and is one part of the housing in this embodiment, or not one part of the housing in other feasible shape, for example, being installed at the internal part of the accommodation space of the housing, or on the stator of the vibration motor. The ball location device 142 is applied to limitation of locations of multiple balls 144, that is, the locations of the balls 144 are immobile relatively on the ball location device, except rolling of the balls of course. The internal guide device 142 is fixed on the mass 131 and the ball location device 142 is arranged between the internal guide device 142 and the external guide device 141 in the way of clamping; and the so-called installation in the way of clamping shall purely involve the positional relationship, rather than the combining relationship of the two devices, that is, the ball location device 142 is arranged between the external guide device 141 and the internal guide device 143. At the same time, the ball location device 142 is moveable with respect to the stator. The external guide device 141 is fixed on the housing and the internal guide device 143 is fixed on the mass 131 (or on the vibrator 13) in the embodiment. Therefore, the external guide device 141 is combined with the stator actually, while the internal guide device 143 is combined with the vibrator. The guide device 14 shall be optionally arranged at a center of gravity of the vibrator 13 or the place nearby in order to support the vibrator 13 stably and provide stable vibration locus. The balls 134 pass through the ball location device 142 and the part of the same located on two sides of the ball location device 142 is propped up the external guide device 141 and the internal guide device 143. When the vibrator 13 vibrates, the internal guide device 143 shall vibrate with the vibrator; while the balls 144 shall roll in the internal guide device 143 oppositely. The ball location device 142 may slide along vibration direction of the vibrator as a result of friction force between the internal guide device 143 and the balls because the locations of the balls 144 shall be changed along vibration of the vibrator due to relatively moveable location of the ball location device 142. Therefore, the external guide device 141 and the internal guide device 143 may implement friction of rolling with respect to the balls. Moreover, a limitation devices 121 arranged on two ends of the ball location device respectively are arranged on the vibration direction of the vibrator 13 in order to limit separation from the cooperation between the ball location device and the external guide device 141 and the internal guide device 143 during sliding and prevent the ball location device from collision with the mass during sliding, and therefore, the displacement of the ball location device shall be limited by the limitation device 121 during sliding.

Figure 3:
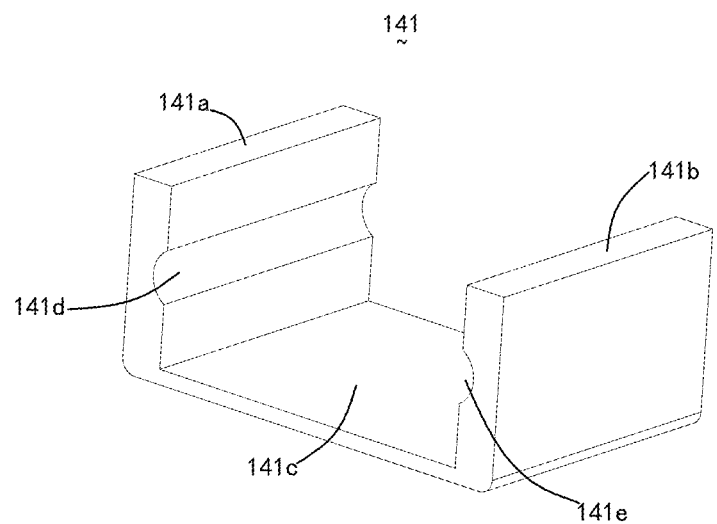
FIG. 3 is an isometric view of an external guide device of a guide device of the linear vibration motor in FIG. 1.

The isometric view of the external guide device 141 is shown in FIG. 3, and the external guide device 141 comprises a first side wall 141a and a second side wall 141b which are opposite to each other, and a bottom ball 141c connecting one end of the first side wall 141a and the second side wall 141b. A first guide slot 141d is provided on the first side wall 141a while a second guide slot 141e is provided on the second side wall 141b. Moreover, the first side wall 141a and the second side wall 141b are located on two sides of the vibrator 13 respectively and are immobile with respect to the stator after being assembled as shown in FIG. 7.

Figure 4:
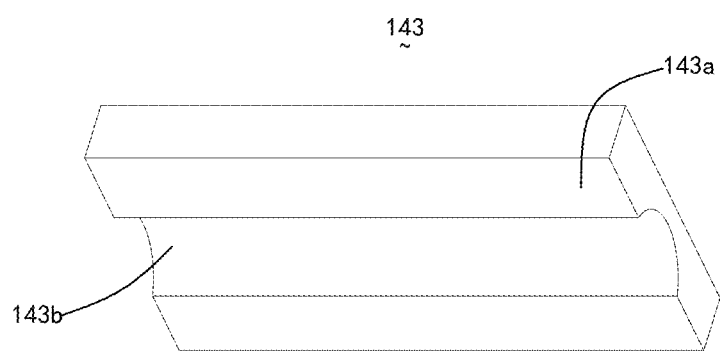
FIG. 4 is an isometric view of an internal guide device of the guide device of the linear vibration motor in FIG. 1.

The isometric view of the internal guide device 143 is shown in FIG. 4, and the internal guide device 143 comprises a main body 143a and an internal guide slot 143b arranged on the main body 143. The linear vibration motor has two internal guide devices 143 which are located on two sides of the vibrator and corresponding to the first side wall 141a and the second side wall 141b of the external guide device (referring to FIG. 7). Of course, the internal guide device, like the external guide device, can be formed as the integral structure having the bottom wall as long as the vibrator has the structure corresponding to the external guide device. Similarly, the external guide device may have two independent components which are fixed on the housing or the stator respectively and will not affect the moving relationship with the internal guide device.

Figure 5:
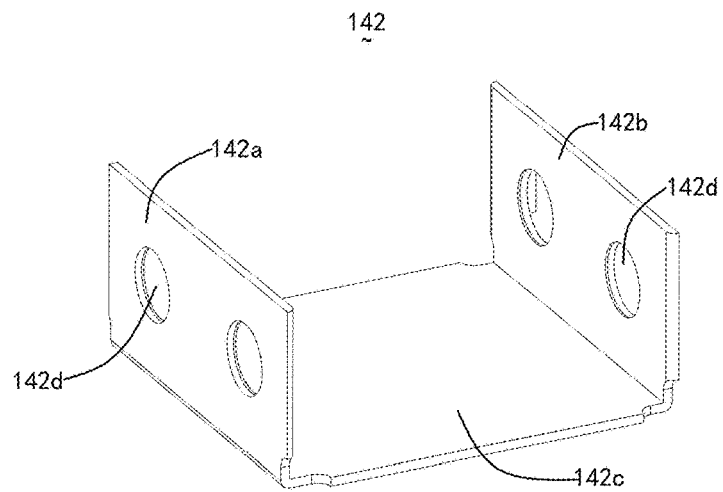
FIG. 5 is an isometric view of a ball location device of the guide device of the linear vibration motor in FIG. 1.

The isometric view of the ball location device 142 is shown in FIG. 5, and the ball location device 142 comprises a first location wall 142a and a second location wall 142b which are opposite to each other and a connecting wall 142c connecting the first location wall and the second location wall. At the same time, multiple location holes 142d are provided on the first location wall 142a and the second location wall 142b. As previously mentioned, the ball location device 142 may include two independent components but not have the connecting wall 142c.

Figure 6:
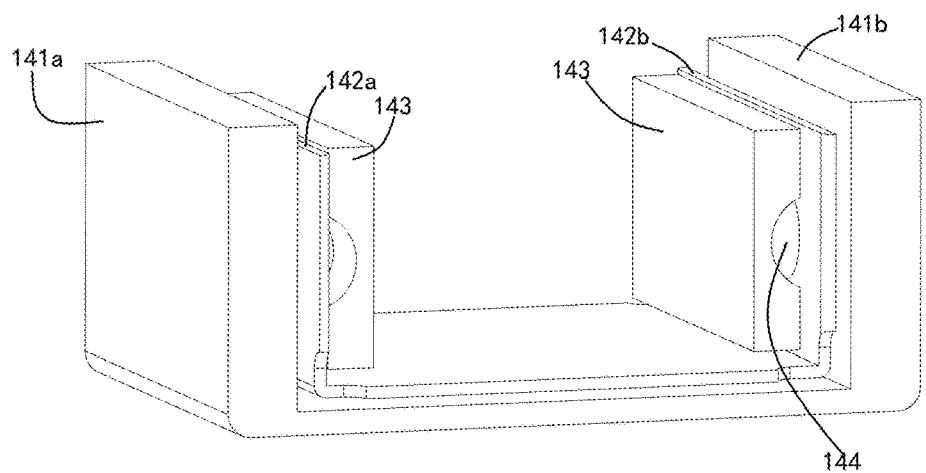
FIG. 6 is an isometric view of an assembly of the external guide device, the internal guide device and the ball location device in FIGS. 3-5.
Figure 7:
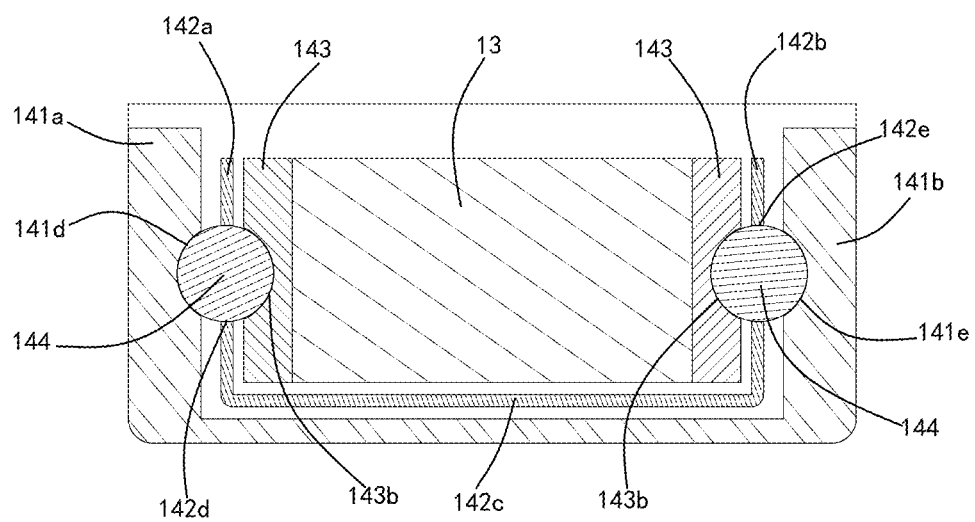
FIG. 7 is a cross-sectional view of the linear vibration motor taken along Line VII-VII in FIG. 2.

As shown in FIG. 6 and FIG. 7, the first location wall 142a is positioned between the internal guide device 143 and the first side wall 141a, and the second location wall 142b is positioned between the internal guide device 143 and the second side wall 141b when the external guide device, the internal guide device and the ball location device are assembled together. The ball 144 is arranged in a first location hole 142d of the first location wall 142a, one end of the same shall be accommodated in the first guide slot 141d of the external guide device, and the other end of the same shall be accommodated in the internal guide slot 143b of the internal guide device. Further, the ball 144 is arranged in the second location hole 142e of the second location wall 142b, one end of the same shall be accommodated in the second guide slot 141e of the external guide device, and the other end of the same shall be accommodated in the internal guide slot 143b of the internal guide device. A gap is reserved between the bottom of the vibrator and the connecting wall 142c of the ball location device in order to facilitate vibration. Further, the positional relationship of the balls and the ball location device will not be changed because the ball location device is moveable opposite to the stator, while the opposite positions of the ball and the external guide device and the opposite position of the ball and the internal guide device will be changed along vibration of the vibrator. Moreover, rolling friction occurs between the external guide device and the ball and the internal guide device and the ball with minimum friction force; therefore, the vibrator can vibrate smoothly.

The balls and the ball location device can be driven to roll by the internal guide device during vibrating process of the vibrator. The balls may roll in the guide slot of the external guide device and the internal guide slot of the internal guide device during movement of the ball location device because the location of the ball location device is moveable with respect to the stator or the housing. Therefore, the vibrator is suspended in the housing by the balls actually and vibrates along extension direction of the guide slot and the internal guide slot. In this way, the vibration direction of the vibrator is limited in the extension direction of the guide slot and the internal guide slot.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A linear vibration motor including:
    a housing,
    a vibrator placed in the housing;
    an elastic component providing the vibrator with restoring force;
    a guide device, including:
    an internal guide device fixed on the vibrator,
    an external guide device fixed on the housing corresponding to the internal guide device,
    a ball location device arranged between the internal guide device and the external guide device, the ball location device being movable along a vibration direction of the vibrator;
    a plurality of balls positioned on the ball location device, the balls abutting against the external guide device and the internal guide device respectively by passing through two sides of the ball location device;
    the guide device is positioned at the center of gravity of the vibrator.

2. The linear vibration motor according to claim 1, wherein the external guide device is one part of the housing.

3. The linear vibration motor according to claim 1, wherein the internal guide device is one part of the vibrator.

4. The linear vibration motor according to claim 1, wherein the external guide device comprises a first side wall and a first guide slot arranged on the first side wall; and correspondingly, the internal guide device is equipped with a main body and an internal guide slot arranged on the main body; the ball location device comprises a first location wall corresponding to the first side wall and a plurality of location holes arranged on the first location wall; the balls are placed in the first location holes, and parts of the balls positioned on two sides of the first location wall are accommodated in the first guide slot and the internal guide slot, respectively.

5. The linear vibration motor according to claim 4, wherein the external guide device comprises a second side wall and a second guide slot arranged on the second side wall; the second side wall and the first side wall are positioned on two sides of the vibrator, respectively; correspondingly, the ball location device includes a second location wall corresponding to the second side wall and multiple second location holes arranged on the second location wall; the balls are placed in the second location holes; the internal guide device is installed opposite to the internal guide device and on other side of the vibrator; and the parts of the balls positioned on two sides of the second location all are placed in the second guide slot and the internal guide slot of the internal guide device, respectively.

6. The linear vibration motor according to claim 1 further comprising a limiting device fixed on the housing for limiting moving range of the ball location device.

7. The linear vibration motor according to claim 6, wherein the limiting device is positioned on two ends of the ball location device.

8. The linear vibration motor according to claim 5, wherein the first side wall is connected with the second side wall by a bottom wall.

9. The linear vibration motor according to claim 5, wherein the first location wall is connected with the second location wall by a connecting wall.

* * * * *